United States Patent [19]
D'Aluisio et al.

[11] Patent Number: 5,791,674
[45] Date of Patent: Aug. 11, 1998

[54] BICYCLE SUSPENSION SYSTEM

[75] Inventors: Christopher P. D'Aluisio, Bethel; Mario M. Galasso, Redding, both of Conn.

[73] Assignee: Cannondale Corporation, Bethel, Conn.

[21] Appl. No.: 816,531

[22] Filed: Mar. 13, 1997

[51] Int. Cl.[6] .................................................. B62K 25/04
[52] U.S. Cl. ...................... 280/284; 280/281.1; 280/283; 180/227
[58] Field of Search ...................... 280/281.1, 283, 280/284; 180/227

[56] References Cited

U.S. PATENT DOCUMENTS

| | | | |
|---|---|---|---|
| 1,010,142 | 11/1911 | Horton | 180/227 |
| 4,463,824 | 8/1984 | Boyesen | 180/227 |
| 4,671,525 | 6/1987 | Ribi | 280/284 |
| 5,205,572 | 4/1993 | Buell et al. | 280/284 |
| 5,226,674 | 7/1993 | Buell et al. | 280/284 |
| 5,332,246 | 7/1994 | Buell | 280/284 |
| 5,452,910 | 9/1995 | Harris | 280/284 |
| 5,553,881 | 9/1996 | Klassen et al. | 280/284 |

*Primary Examiner*—Brian L. Johnson
*Assistant Examiner*—Michael Cuff
*Attorney, Agent, or Firm*—Pennie & Edmonds LLP

[57] ABSTRACT

A bicycle comprising: a frame comprising a down tube with a crank assembly coupled thereto; a front wheel; a front fork assembly for coupling the front wheel to the frame; a rear wheel; and a suspension assembly for coupling the rear wheel to the frame. The suspension assembly is comprised of a swing arm having a first end coupled to the rear wheel and a second end having a first connection point and an intermediate point between the first and second ends having a second connection point. The suspension assembly is further comprised of a first link coupled to the first connection point and to the frame and a second link coupled to the second connection point and to the frame, wherein the frame, the swing arm and the first and second links form an effective pivot point of the suspension assembly that is above the crank assembly and that moves in a forward direction when the rear wheel moves in an upward direction.

19 Claims, 10 Drawing Sheets

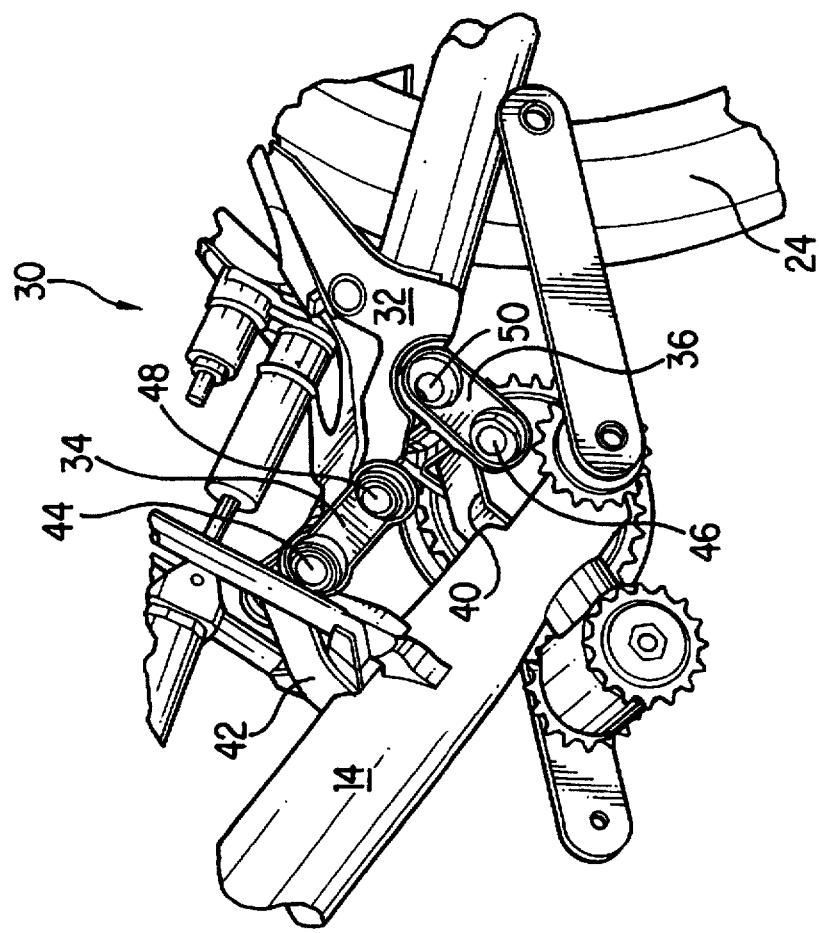
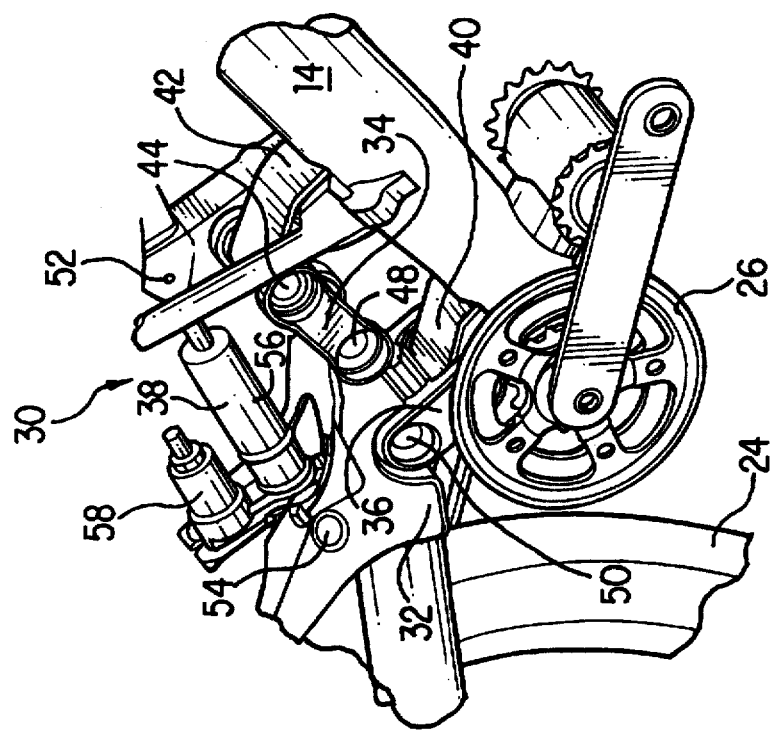

BICYCLE SUSPENSION SYSTEM

FIELD OF THE INVENTION

The present invention is directed to a suspension system that is particularly useful for vehicles such as bicycles. More particularly, the invention is directed to an improved four-bar linkage suspension system that is particularly useful for the rear suspension for a bicycle.

BACKGROUND OF THE INVENTION

Many vehicles use suspension systems to absorb shocks due to the terrain that the vehicle traverses. Off road vehicles such a trucks, motorcycles and bicycles generally have suspension systems that have greater travel for the wheels so that larger shocks may be absorbed. The suspension systems on bicycles are particularly designed to be low weight and to provide proper suspension characteristics for a system that has a moving center of gravity. i.e., the rider.

Bicycle rear suspensions are generally made with a single pivot point. That is, the rear wheel of the bicycle is coupled to a swing arm and the swing arm is coupled to the bicycle frame at single pivot point. Thus, the rear wheel will move along an arc about that single pivot point.

Many rear suspension are made with the pivot point at the same height as the rear wheel axle and/or about the crank assembly center. As soon as the rear axle goes above the pivot point, the chain force tends to pull the suspension in further compression. This exaggerates the suspension and creates a sag effect that can be felt when pedaling. Not only can the sag effect be felt, but it is a loss of pedalling energy. Another problem associated with this type of suspension is that the swing arm is parallel to the ground. When the rear wheel hits a bump, the resultant force is generally at a 15° to 20° angle to the horizontal. Thus, a substantial portion of the resultant force pulls on the swing arm and slows the rider down.

To overcome these problems, the pivot point of many suspension units have been raised above the front chain ring. By doing this, the sag effect and the pull on the suspension is reduced or eliminated. In these systems, the resultant force on the rear wheel from hitting a bump is more perpendicular to the swing arm. This reduces the backward pull on the swing arm and the bike. However, during the compression travel of the rear wheel, these suspension systems tend to force the rear wheel in a backward direction which applies tension on the chain. Thus, the chain tension fights the suspension's travel, particularly at the upper end of the compression travel.

U.S. Pat. No. 5,452,910, which issued to Trevor Harris on Sep. 26, 1995, discloses a four-bar linkage suspension system where the swing arm is connected to the bicycle down tube at two locations. The suspension is designed to provide a straight line trajectory of the rear wheel in an upward and rearward direction at an angle that is about 20° to 30° with respect to a vertical line through the rear axle. As discussed above, this would generally create chain tension like a high single pivot point unit. Harris has overcome this problem by fixing the crank assembly directly to the swing arm. This type of system is called a unified rear swing arm and the crank assembly moves with the swing arm. This creates two very significant problems. First, in order to move the rear wheel axle in a rearward direction, the swing arm moves in a backward direction relative to the frame. Since the crank assembly is attached to the swing arm, it too moves. Thus, the crank assembly is moving back and forth under the rider when the suspension system is operating. Not only does this create a strange sensation, but the power that the rider can apply to the pedals is reduced when the pedals are not at the optimum location. Moreover, a main objective of any suspension unit is to have a small unsprung weight, i.e., the weight of the rear wheel and swing arm in most cases. However, in a unified system such as this, the crank assembly weight and the rider's weight when he is standing is added to the unsprung weight. This practically prohibits the suspension system from reacting at all. Thus, there are significant problems associated with this type of suspension.

The suspension system disclosed in U.S. Pat. No. 4,671,525 also has a four-bar linkage system where the swing arm is moved in a rearward direction to provide a rearward and upward rear wheel trajectory. As discussed above, the suspension movement of this type of unit is restrained by the chain tension. In order to avoid the chain tension problem discussed above, this system relies on multiple chains. The smaller chains 7 and 10 are used and rotate about pivot points. The drive chain 11, which is coupled to the crank assembly via the multiple chains, provides power to the rear wheel.

SUMMARY OF THE INVENTION

The present invention is directed to and improved suspension system for absorbing shock applied to a rear wheel of a vehicle having a frame. The system is designed to provide an efficient mechanism to assist the rear wheel in getting up and over a bump without creating significant chain tension or having a sag effect.

More particularly, the present invention is directed to a suspension system for a vehicle such as a bicycle, that is comprised of a four-bar linkage to create an advantageous rear wheel travel. More particularly, the suspension system provides a rear wheel travel that permits the rear wheel to react favorably to initial bump shock then follow a path that does not greatly vary from an arc about the crank assembly center such that the system does not generate significant chain tension.

The suspension system is essentially comprised of a frame member having a first connection point and a second connection point; a rear wheel having a rear wheel axle; a swing arm having two ends, the swing arm being coupled to the rear wheel axle at one end and having a third connection point and a fourth connection point on the other end; a first link coupling the first connection point on the frame to the third connection point on the swing arm; a second link coupling the second connection point on the frame to the fourth connection point on the swing arm; and a shock absorber coupled between the swing arm and the frame for resisting the relative motion between the swing arm and the frame caused by shock to the rear wheel. The frame, swing arm and first and second links are configured to form a four-bar linkage having an instantaneous center that moves in a vertically downward direction through a substantial portion of the suspension compression stroke. Further, the suspension system is configured such that the instantaneous center also moves in a substantially forward direction through a substantial portion of the suspension compression stroke. In this way, the suspension system provides a swing arm that is substantially perpendicular to the bump force, but does not create significant chain tension.

The suspension system is more preferably configured such that the instantaneous center is at a vertical height that is above the rear wheel axle at the start of the compression travel and below the rear wheel axle when the rear wheel axle is at its maximum compression stroke height.

The present invention is also directed to a suspension system coupling a wheel to a vehicle frame that is comprised of a swing arm for coupling to a wheel axle, a coupling for pivotly connecting the swing arm to a vehicle frame and a moving effective pivot point created by the coupling that moves in a forward and downward direction during an upward movement of the wheel axle.

The present invention is also directed to a bicycle comprising a frame having a crank assembly coupled thereto; a front wheel; a front fork assembly for coupling the front wheel to the frame; a back wheel and a suspension assembly for coupling the back wheel to the frame. The suspension assembly is comprised of a swing arm having a first end coupled to the rear wheel and a second end having two connection points; a first link coupled to one of the swing arm connection points and to the frame and a second link coupled to the other of the swing arm connection points and to the frame. The frame, the swing arm and the first and second links are configured to form an effective pivot point that is above the crank assembly and that moves in a generally forward direction when the rear wheel moves in an upward direction. Thus, the rear wheel is pulled by the first and second links in a forward direction to assist the wheel in clearing the obstacle. More preferably, the suspension system is configured such that the rear wheel's initial compression travel is in a an upward and rearward direction, that is away from an arc about the crank arm assembly so that there is reduced backward pull on the swing arm from the initial shock force. However, the suspension system also is configured such that during the later part of the compression travel the rear wheel substantially follows the arc about the crank assembly so that chain tension is minimized.

BRIEF DESCRIPTION OF THE DRAWINGS

FIG. 2 is a partial perspective view of the suspension system according to the present invention;

FIG. 3 is another partial perspective view of the suspension system according to the present invention;

DETAILED DESCRIPTION OF THE PREFERRED EMBODIMENT

Figure 1:
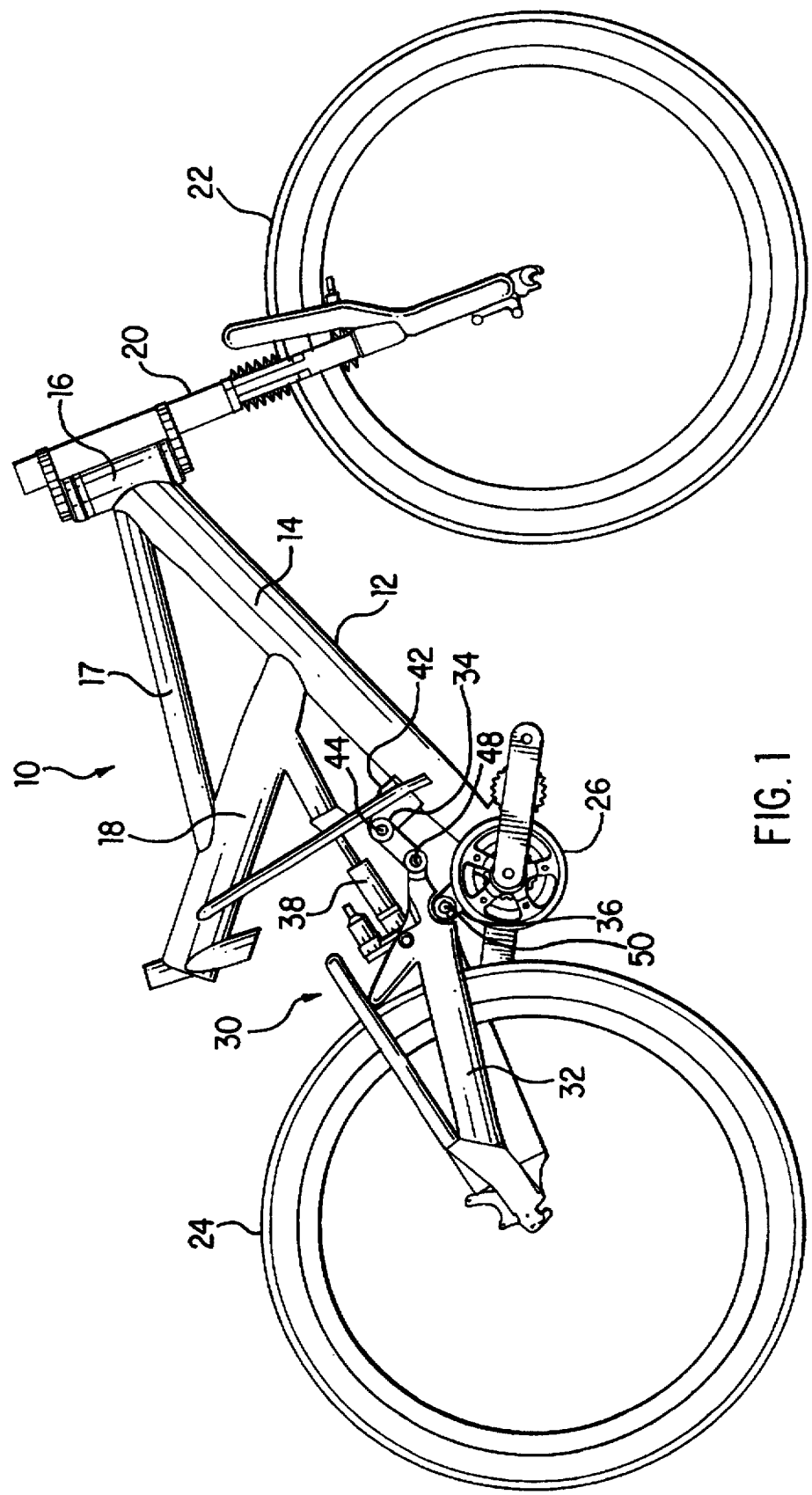
FIG. 1 is a side view of a bicycle with a rear suspension according to the present invention.

As discussed above, the present invention is directed to a suspension system for a vehicle such as the bicycle depicted in FIG. 1. The bicycle 10 is comprised of a bicycle frame 12 which in this instance includes a down tube 14, a head tube 16, a front top tube 17 and a back top tube 18. Mounted to the head tube 16 is a front suspension system 20 and a front wheel 22. A rear wheel 24 is mounted to the bicycle frame via a suspension assembly 30 according to the present invention. The bike 10 is, thus, a full suspension bike in that it has suspension for the front and rear wheels 22 and 24. The bike 10 further includes a crank assembly with a primary front sprocket 26 that provides power to the rear wheel via a chain, not shown.

The suspension assembly 30 is comprised of part of the frame 12 and in particular part of the down tube 14, a swing arm 32 and two links 34 and 36 extending from the frame. Finally, the suspension assembly includes a shock absorber 38 mounted between the swing arm 32 and the frame 12. As discussed above, the prior art suspension systems included four-bar linkage suspension systems mounted to the down tube of a bike. However, these systems were mounted to the bottom side of the down tube and were configured to create a moving pivot point that moved in a backward and upward direction. The suspension system 30 according to the present invention is mounted to the upper side of the down tube 14. Moreover, the suspension system 30 is configured to provide an optimum rear wheel compression travel path that substantially deviates from an arc about the crank assembly center during the first half of the compression travel, but then more closely follows the arc about the crank assembly center during the later half of the compression travel, as will be discussed in more detail below.

Referring now to FIGS. 2 and 3, the suspension system 30 can be more clearly seen. The suspension system 30 includes the down tube 14 and two members 40 and 42 which extend from the upper side of the down tube 14 and are rigidly mounted thereto. At the end of the mount members 40 and 42 are first and second pivot locations or connection points 44 and 46. Mounted at the pivot locations 44 and 46, via bearing members to reduce stiction, are the two link members 34 and 36. Since the mount members 40 and 42 are rigid, the link members 34 and 36 rotate about the pivot locations or connection points 44 and 46.

At the other end of link member 34 is a third pivot location or connection point 48 and at the other end of link member 36 is a fourth pivot location or connection point 50. The swing arm 32 is pivotly connected to both of the link members 34 and 36 at the pivot locations 48 and 50 by bearing members to reduce stiction. Thus, the frame 12 (down tube 14 and mount members 40 and 42) the link members 34 and 36 and the swing arm 32 form a four-bar linkage for the suspension system 30. These members define the path of the suspension system 30 and rear wheel 24.

The first link 34 is connected to the swing arm 32 at its end, third pivot location 48, and the second link 36 is connected to the swing arm 32 between the connection with the first link 34 and the rear wheel axle 60, fourth pivot location 50. The link 34 is coupled to the frame 12 at the first pivot location 44 to rotate in a downward and forward direction. The second link 36 is coupled to the frame 12 at the second pivot location 46 to rotate in an upward and forward direction.

The shock absorber 38 is coupled between the swing arm 32 and the frame 12 by two pivot locations 52 and 54. The shock includes a damper 56 and a spring 58. The shock absorber 38 provides resistance, preferably by an air spring 58, as well as energy dissipation, preferably by a hydraulic damper 56. Such shock absorbers are readily available from Fox Shocks® or Rock Shox®.

Referring now to FIGS. 4a through 4e, the mechanics of the four-bar linkage suspension system 30 is shown. More particularly, the four-bar linkage suspension system 30 creates an instantaneous center IC which is the intersection of the tangents 35 and 37 of the two link members 34 and 36. The instantaneous center IC is the equivalent pivot point of the swing arm 32, i.e., the point about which the rear wheel axle is traveling in an arc. However, since the instantaneous center is the tangent of the link members 34 and 36, the instantaneous center IC moves throughout the compression travel of the rear wheel. Thus, the suspension system has an equivalent pivot point that moves throughout the suspension travel to provide optimum rear wheel compression travel as will be discussed in more detail below.

Figure 4A:
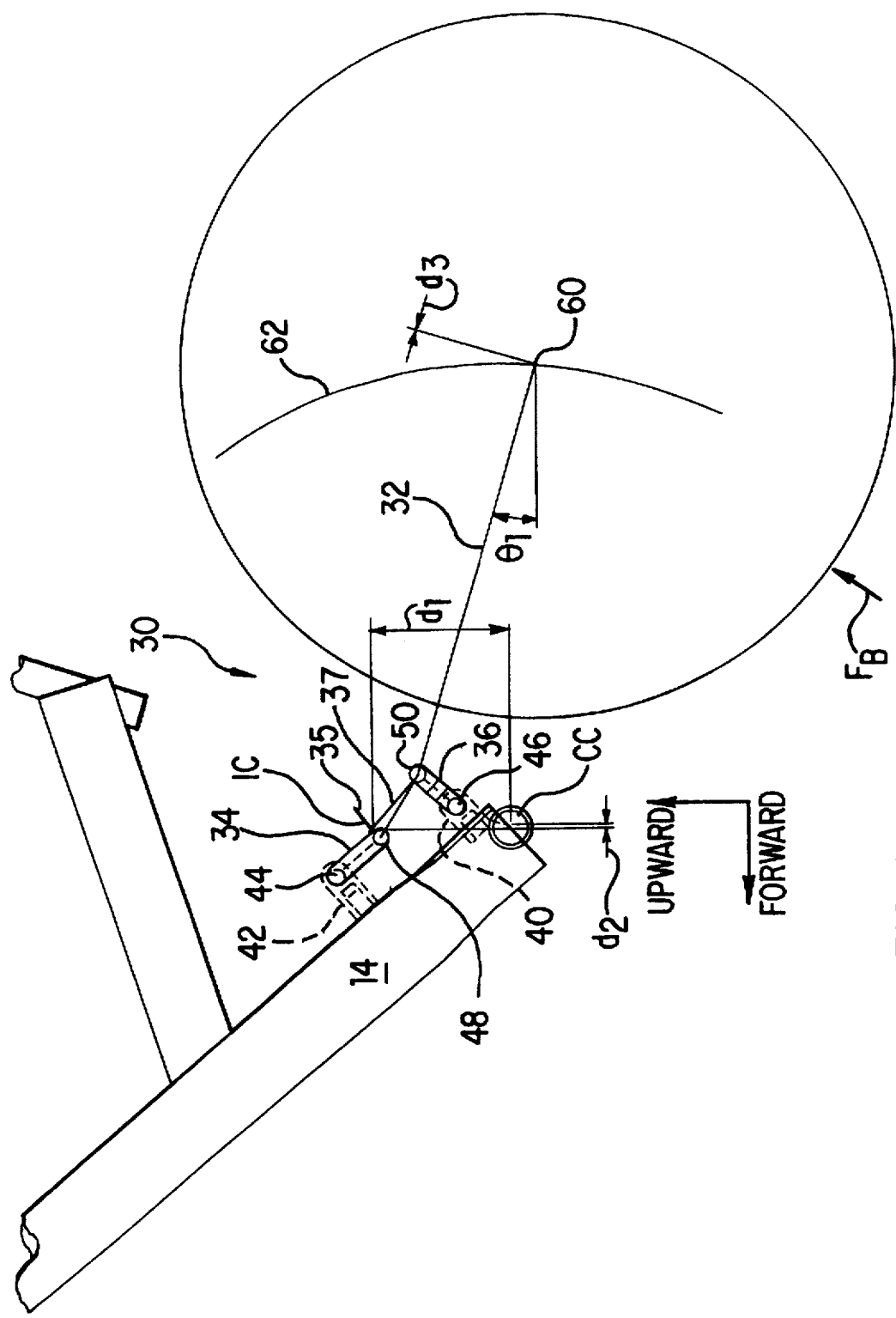
FIG. 4a is a schematic of the suspension system according to the present invention at zero travel.

As shown in FIG. 4a, the suspension assembly 30 is at its rest position prior to shock. The instantaneous center IC of the suspension system 30 is shown at a distance $d_1$ above the crank assembly center CC. Thus, the suspension system 30 has an initial equivalent pivot point that is above the crank assembly center CC. Still further, the instantaneous center IC is located a distance $d_2$ forward of the crank assembly center CC. The swing arm is depicted as line 32 and extends from the linkage members 34 and 36 back to the point 60, which is the center of the rear wheel axle. Still further, the swing arm 32 extends from the rear wheel axle 60 to the linkage members 34 and 36 at an angle to the horizontal $\theta_1$. Preferably the angle $\theta_1$ is between about 10° to 20° and more preferably about 15°. This is important so that the bump force $F_B$ is generally perpendicular to the swing arm 32. As discussed above, this helps the swing arm move up without creating a substantial pulling force on the swing arm 32 and bike 10.

Finally, an arc 62 is shown. The arc 62 is an arc about the crank assembly center CC extending through the rear wheel axle 60. This arc 62 is the path the rear wheel axle would follow if the suspension assembly were mounted about a pivot point that was at the same location as the crank assembly center CC. In other words, this arc 62 is the rear wheel compression path that would create no chain tension on a single pivot suspension assembly as discussed in the background. However, since the swing arm 32 is at an angle $\theta 1$ to the horizontal and the equivalent pivot point IC is above the crank assembly center CC, when the rear wheel hits a bump, the resultant force $F_B$ is closer to a perpendicular direction to the swing arm and parallel to the instantaneous swing arm travel direction. The instantaneous swing arm travel direction being the direction that is perpendicular to the line drawn through the equivalent pivot point IC and the rear wheel axle 60 (see numeral 61 in FIG. 5a).

Figure 4B:
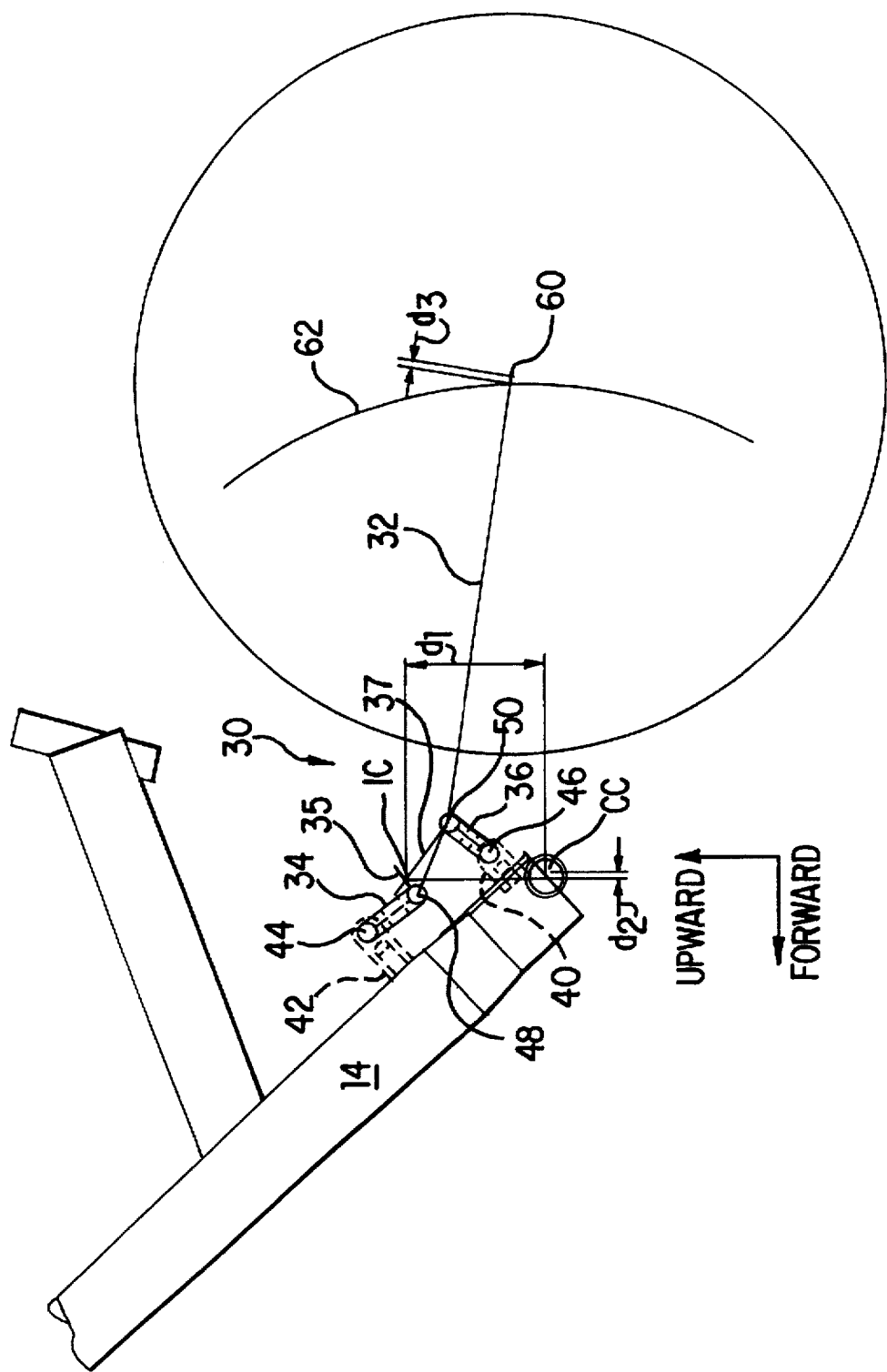
FIG. 4b is a schematic of the suspension system according to the present invention at 1.5 inches of travel.

Referring now to FIG. 4b, the rear wheel has traveled in an upward direction of approximately 1.5 inches or about one-fourth of the suspension travel. As seen from this example, the vertical distance $d_1$ between the instantaneous center IC and the crank assembly center CC has decreased and the horizontal distance $d_2$ between the instantaneous center IC and the crank assembly center CC has increased. In other words, the instantaneous center IC created by the two linkages 36 and 34 has moved in a downward and forward direction. Moreover, the distance $d_3$ between the arc and the center of the axle has increased to about 0.25 inches. In other words, the suspension travel of the rear wheel axle has been in a backward direction compared to the arc 62 created about the crank assembly center CC. Even though the equivalent pivot point IC has moved forward, it was sufficiently above the crank assembly center to start with such that the rear wheel compression travel is in a rearward direction compared to the arc 62.

Figure 4C:
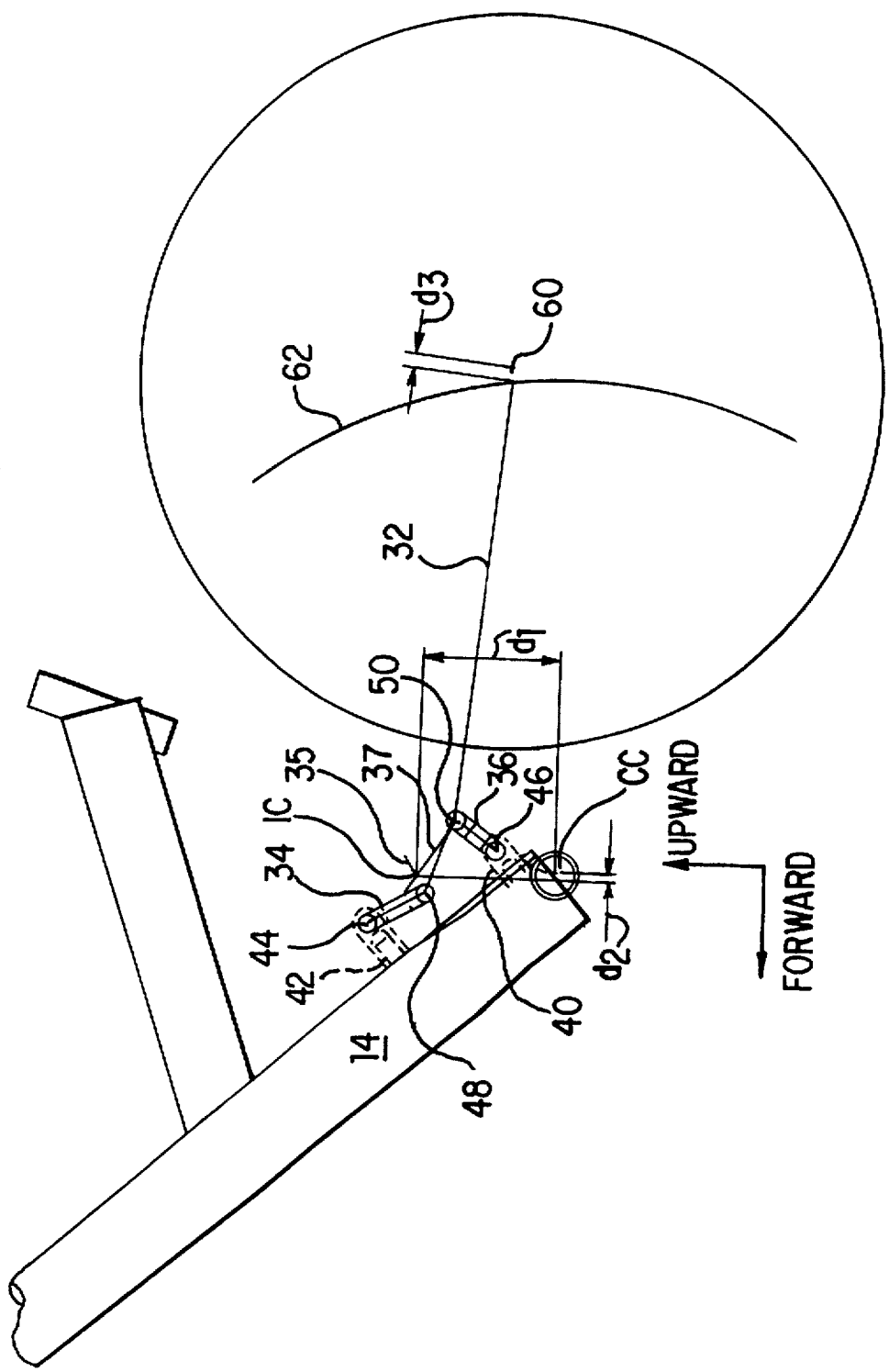
FIG. 4c is a schematic of the suspension system according to the present invention at 3.0 inches of travel.

Referring now to FIG. 4c, the rear wheel has travelled in an upward direction of approximately 3 inches or about one-half of the suspension travel. Again, the vertical distance $d_1$ between the crank assembly center CC and the instantaneous center IC has decreased and the horizontal distance $d_2$ has increased. Thus, the instantaneous center IC is moving in a downward and forward direction. However, the amount of travel in the forward direction at this point is about the same as the travel in the downward direction. Thus, the links 34 and 36 are now pulling the swing arm 32 and rear wheel axle 60 in a more forward direction and the cantilever effect in the initial compression travel shown in FIGS. 4a and 4b is decreased.

The distance $d_3$ between the rear wheel axle 60 and the arc 62 about the crank assembly center has increased to about 0.44 inches. At this point in time, the instantaneous center IC is still above the rear wheel axle 60, but the angle $\theta_1$ to the horizontal is less than about 5° such that the rear wheel travel direction is substantially in the upward direction. Thus, the suspension travel direction has changed from being at about 20° to the upward direction at the start of the suspension travel shown in FIG. 4a to being less than about 5° when the suspension system is about half way through the maximum compression travel.

Figure 4D:
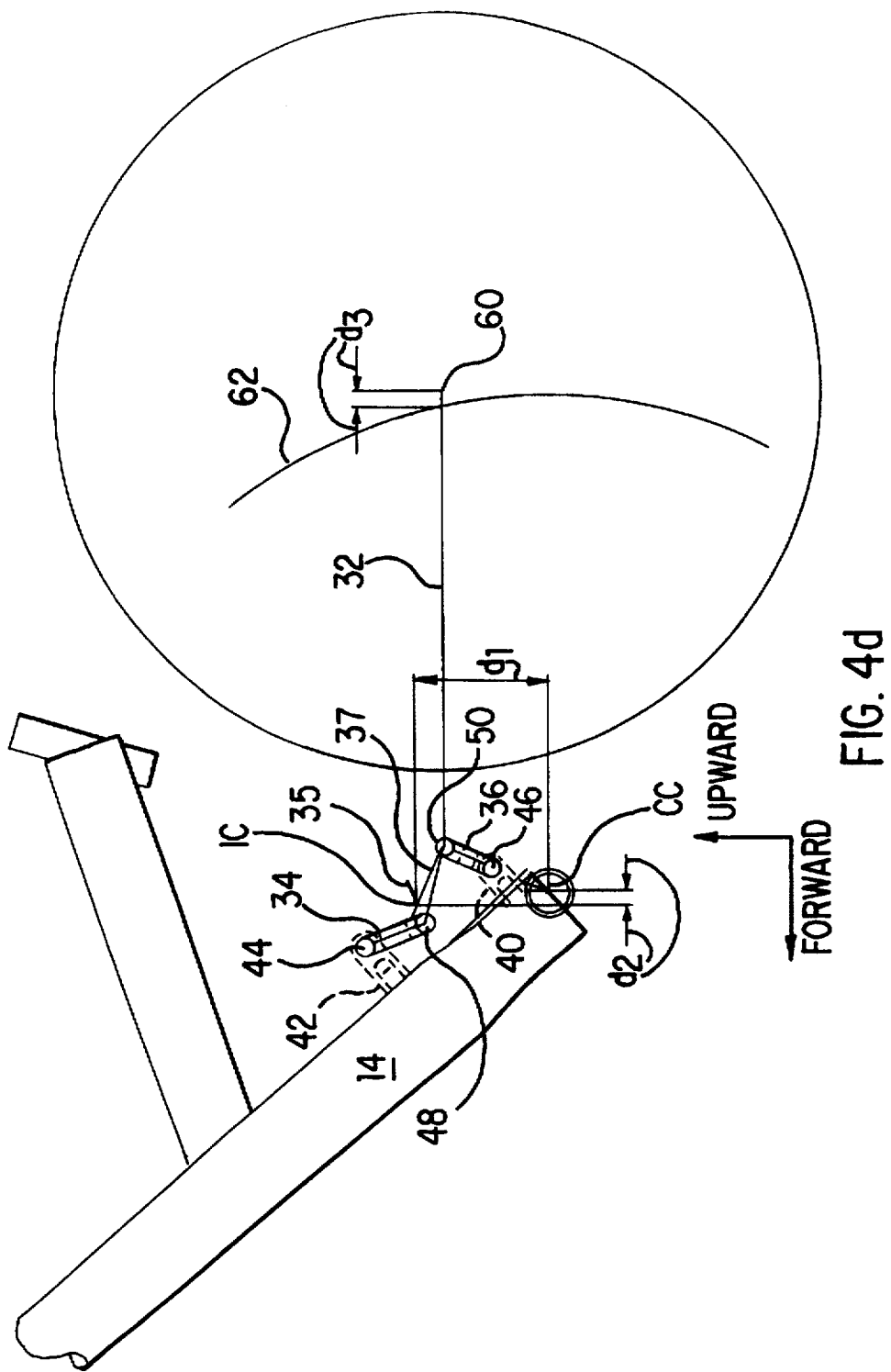
FIG. 4d is a schematic of the suspension system according to the present invention at 4.5 inches of travel.

FIG. 4d discloses the suspension system 30 after the rear wheel has travelled approximately 4.5 inches or approximately three-fourths of the maximum compression travel. At this point in time, the instantaneous center of the four-bar linkage is only slightly above the rear wheel axle so that the instantaneous rear wheel travel direction is substantially in the upward direction. The vertical distance $d_1$ between the instantaneous center IC and the crank assembly center CC has decreased again and the horizontal distance $d_2$ has increased again. Still further, the distance $d_3$ between the arc 62 and the rear wheel axle 60 has increased to about 0.56 inches. However, the links 34 and 36 are rotating the pivot points 48 and 50 in more of a forward direction than in a downward direction. Thus, at this point, the instantaneous rear wheel travel direction is substantially in the upward direction and the links 34 and 36 are moving the swing arm 32 and rear wheel axle 60 in a forward direction.

Figure 4E:
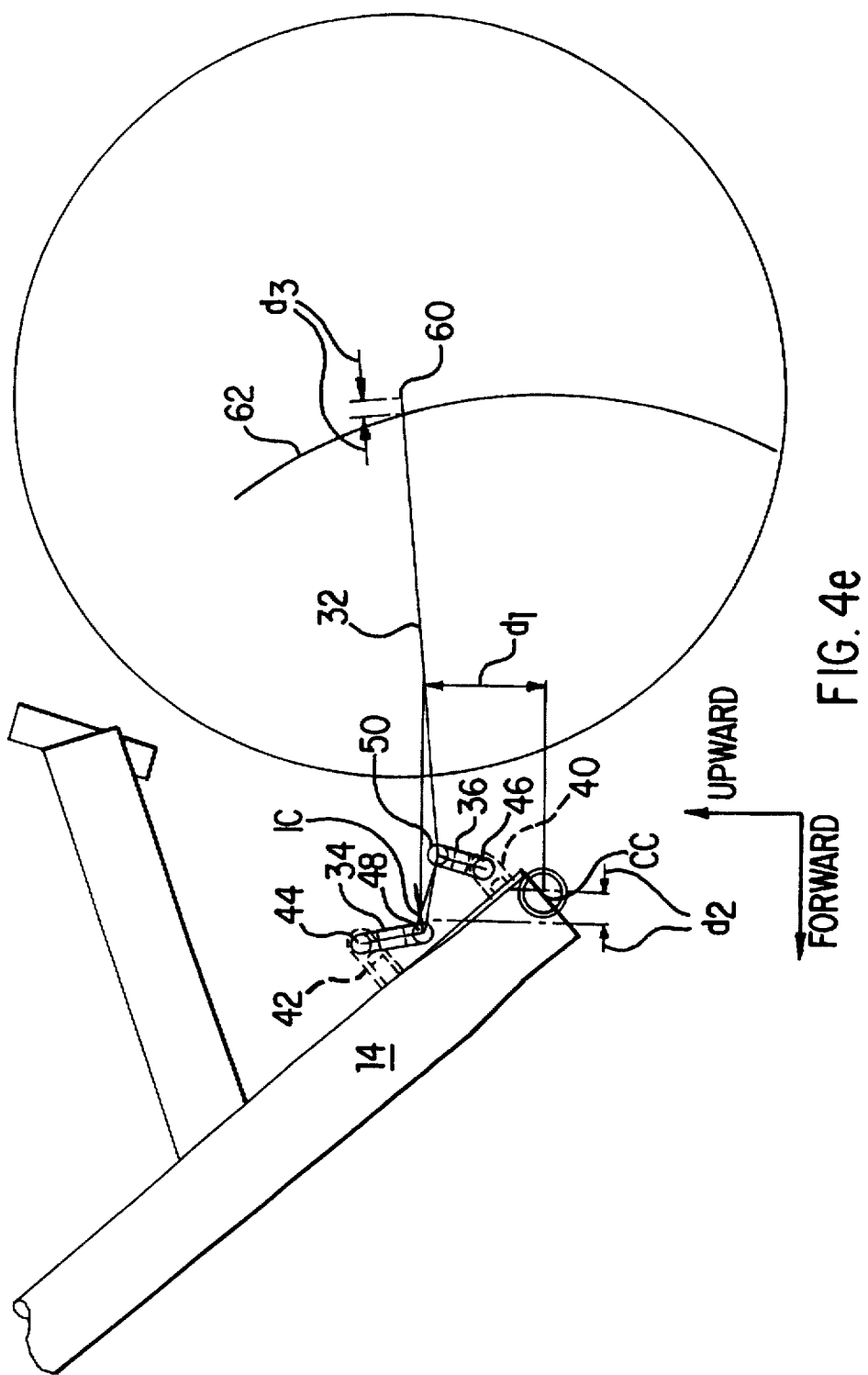
FIG. 4e is a schematic of the suspension system according to the present invention at 6.0 inches of travel.

Referring now to FIG. 4e, the rear wheel has travelled about 6 inches, or approximately all of the compressive travel. The instantaneous center IC of the four-bar linkage is below the vertical position of the rear wheel axle 60. The travel direction of the instantaneous center is still in a downward direction since $d_1$ has decreased and in a forward direction since $d_2$ has increased. However, the travel of the instantaneous center IC is substantially more in the forward direction than in the downward direction. Moreover, the rear wheel axle 60 is still only about 0.56 inches away from the arc 62 created about the crank assembly center. Thus, the rear wheel axle 60 is now following a path which is very close to the arc 62 and that is in an upward and forward direction. By this means, substantial chain tension is avoided during the last part of the rear wheel compressive travel, which is untrue for those types of suspension assemblies that have a travel direction that consistently follow a backward and upward direction.

Thus, the suspension assembly 30 according to the present invention extends in an upward direction but it also moves the rear axle up and forward over the obstacle that is being cleared. Thus, the suspension assembly overcomes shocks much quicker and efficiently than the prior art suspension systems. Therefore, not only does the suspension start in a direction parallel to the bump force $F_B$, the suspension travel ends in a path that is almost parallel to an arc created about the crank assembly center to avoid substantial chain tension and to assist the rear wheel in clearing the obstacle. Thus, the suspension assembly includes the advantages of the single pivot locations discussed in the background without any of the negative effects.

The suspension assembly 30 provides for a four-bar linkage that has an instantaneous center IC which travels in a downward and forward direction substantially through the compression travel. The instantaneous center IC movement is in more of a downward direction during the first half of the maximum suspension compressive travel and more in a forward direction during the second half of the maximum suspension compression travel. The instantaneous center IC begins the shock substantially above the rear wheel axle 60 such that the rear wheel axle 60 has an initial travel direction in a rearward and upward direction to help alleviate negative pull on the swing arm, but the swing arm quickly gets up and over this obstacle because the instantaneous center IC travels in a forward direction, pulling the swing arm 32 and rear wheel axle 60 forward. This assists the rear wheel 24 in getting up and over the obstacle and creating a suspension assembly that does not have substantial chain pull from a backwards traveling rear wheel axle.

The following table sets forth the preferred parameters of the suspension travel as discussed above:

| FIG. | ST  | $d_1$ | $d_2$ | $d_3$ | $\Delta d_3$ |
|------|-----|-------|-------|-------|--------------|
| 4a   | 0   | 5.1   | .11   | 0     | 0            |
| 4b   | 1.5 | 4.9   | .17   | .25   | .25          |
| 4c   | 3   | 4.8   | .29   | .44   | .19          |
| 4d   | 4.5 | 4.6   | .5    | .56   | .12          |
| 4e   | 6   | 4.3   | 1.0   | .56   | 0            |

ST = suspension travel (in.)
$d_1$ = vertical distance between instantaneous center and center of crank assembly (in.)
$d_2$ = horizontal distance between instantaneous center and center of crank assembly (in.)
$d_3$ = distance between rear wheel axle and arc about center of crank assembly (in.)
$\Delta d_3$ = amount $d_3$ changed from previous measure Referring now to FIGS. 5a–5c, the suspension system 30 is shown in a schematic to show the relation of the instantaneous center IC with the rear wheel axle 60 through the rear wheel compression travel. The arc 62 about the crank assembly center is again shown for reference.

Figure 5A:
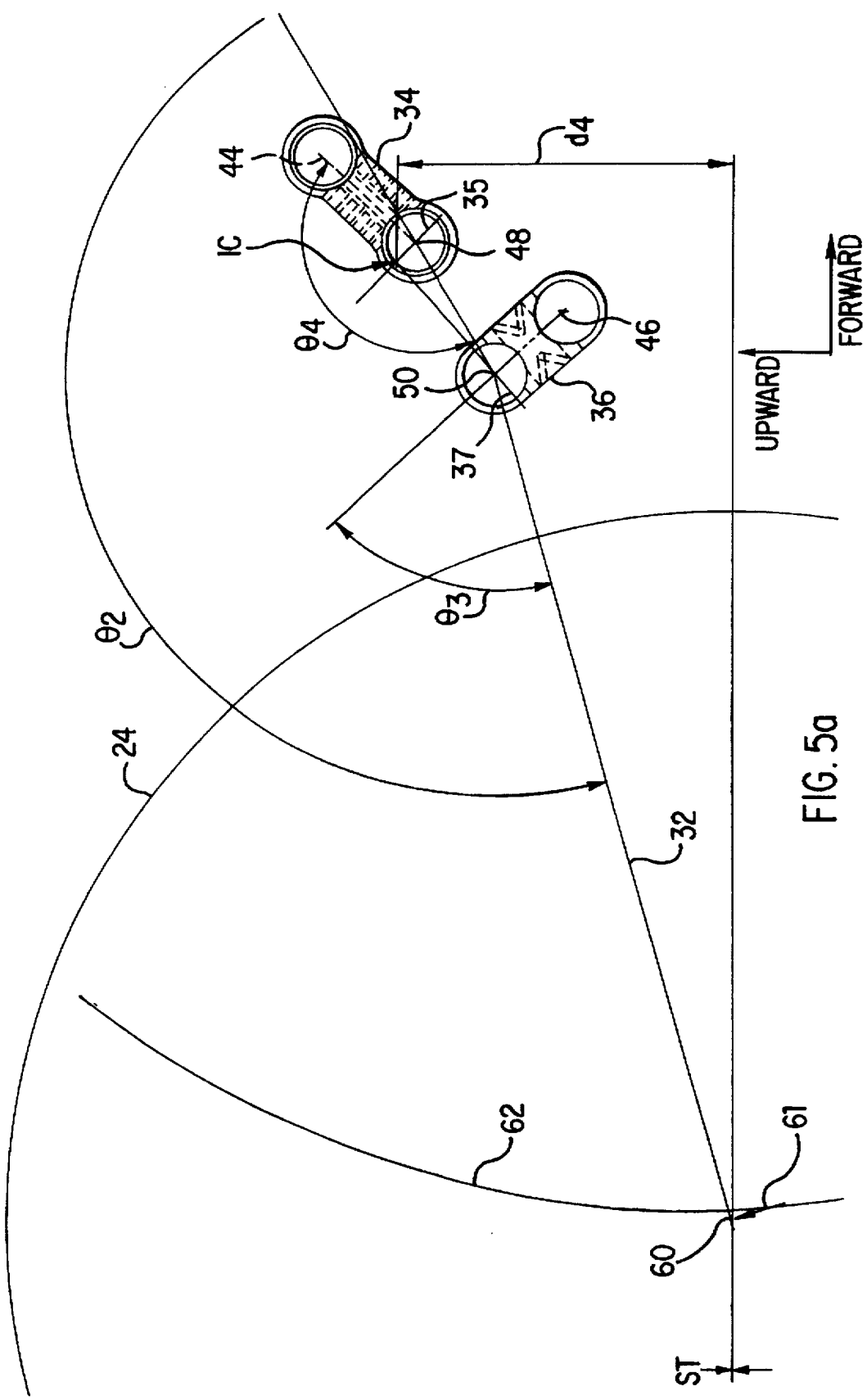
FIG. 5a is a schematic of the suspension system according to the present invention at zero travel.

In FIG. 5a, the suspension system 30 is at the rest position. The angle $\theta_2$ is the angle of the swing arm 32 between the first section that extends between the pivot locations 48 and 50 and a second section that extends between the pivot location 50 and the rear wheel axle 60. Preferably, the swing arm has an angle $\theta_2$ that is less than 180° and more preferably, is about 165°.

As shown, the instantaneous center IC is located above the rear wheel axle 60 by a height of $d_4$. Since the rear wheel axle travel direction 61 is defined by the instantaneous center IC location, the initial travel direction 61 of the rear wheel axle 60 is in a substantially backward and upward direction. Preferably, the initial travel direction 61 is about 20° in a backward direction to the upward direction as shown. Thus, the initial travel direction 61 is substantially parallel to the bump force $F_B$ on the rear wheel (see FIG. 4a).

Still further, the tangent 35 of the first link 34 shows that the initial rotation of the first link 34 about pivot location 44 is in a substantially downward and forward direction. The tangent 37 of the second link 36 shows that the initial rotation of the second link 36 about pivot location 46 is in a substantially upward and forward direction. Thus, the links 34 and 36 are configured such that the swing arm 32 is cantilevered about the second link 36. That is the downward movement of the third pivot location 48 and the upward movement of the fourth pivot location 50 assist the rear wheel axle 60 in travelling in an upward direction. This assists the rear wheel in clearing an obstacle.

Figure 5B:
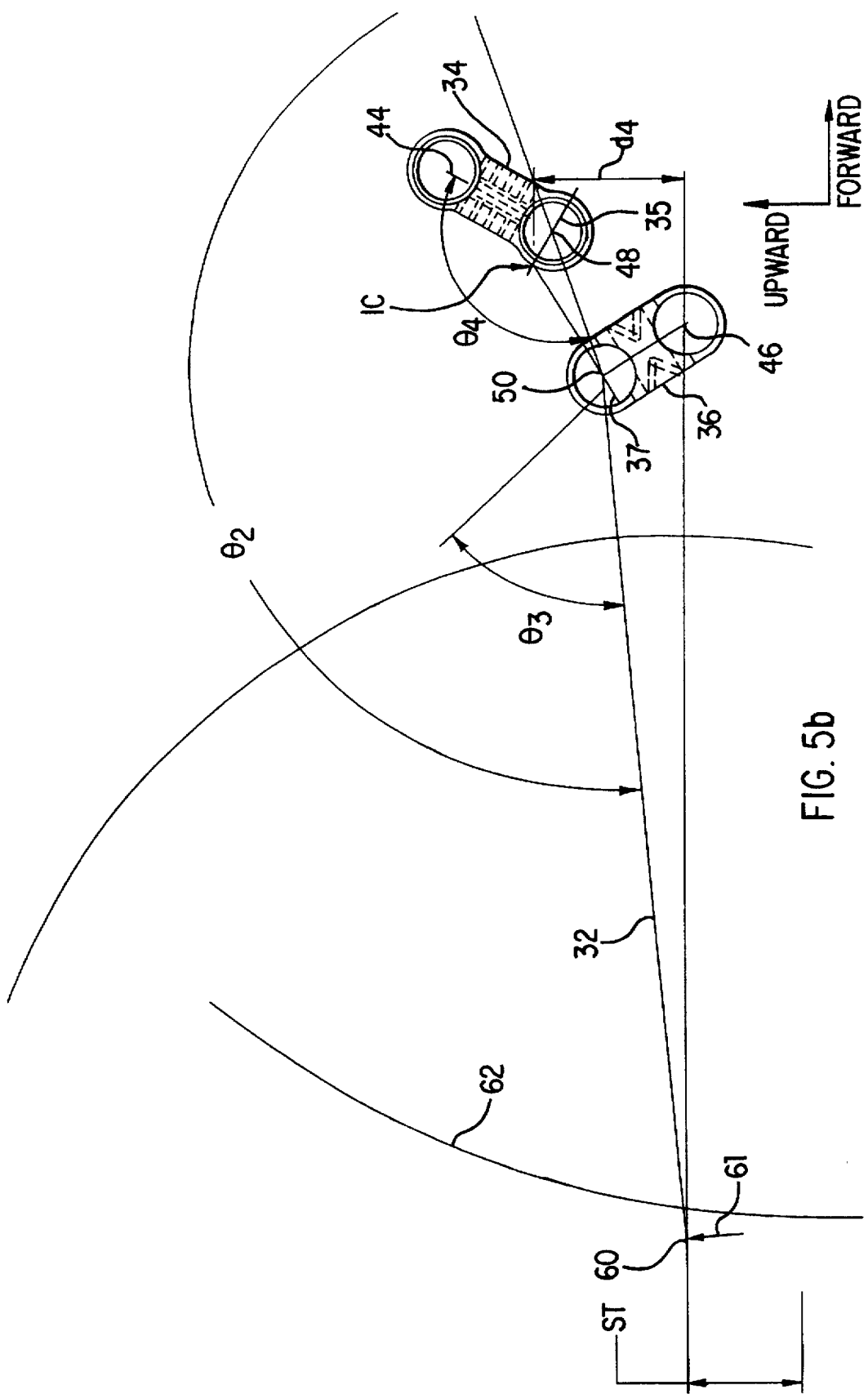
FIG. 5b is a schematic of the suspension system according to the present invention at 3.0 inches of travel.

Referring now to FIG. 5b, the suspension system 30 is shown at a point of about half of the maximum compression travel or at about 3 inches of travel. At this point, the travel direction 61 of the rear wheel is in a more upward direction. Moreover, the pivot locations 48 and 50 are now moving in a substantially more forward direction. Thus, the links 34 and 36 are now moving the swing arm 32 in a more forward direction.

Figure 5C:
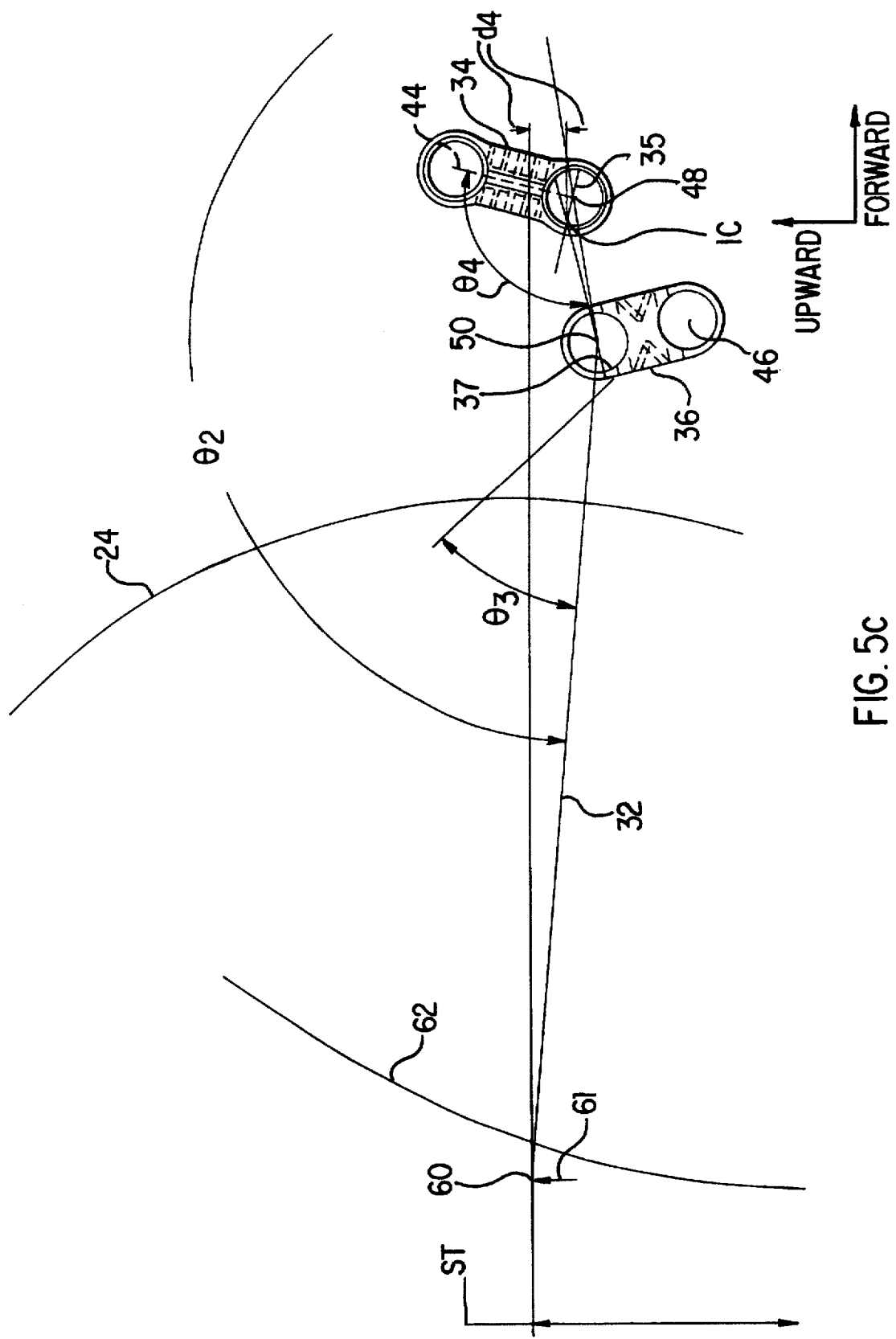
FIG. 5c is a schematic of the suspension system according to the present invention at 6.0 inches of travel.

Referring to FIG. 5c, the suspension system is shown at a point close to the maximum compression travel or at about 6 inches. At his point, the travel direction 61 of the rear wheel axle is substantially upward and slightly forward. However, the pivot locations 48 and 50 are moving in a substantially forward direction, pulling the swing arm 32 and rear wheel forward over the obstacle.

The following table sets forth the preferred parameters of the suspension travel as discussed above:

| FIG. | ST  | $d_4$ | $\theta_2$ | $\theta_3$ | $\theta_4$ |
|------|-----|-------|------------|------------|------------|
| 5a   | 0   | 6.1   | 165        | 63         | 164        |
| 5b   | 3.0 | 2.8   | 165        | 52         | 140        |
| 5c   | 6.0 | −1.0  | 165        | 42         | 113        |

ST = suspension travel (in.)
$d_4$ = vertical distance the instantaneous center IC is above the rear wheel axle 60 (in.)
$\theta_2$ = the angle of the swing arm 32 bend
$\theta_3$ = the angle of the swing arm 32 with respect to the original position of second link 36
$\theta_4$ = the angle of the swing arm 32 with respect to the instantaneous position of first link 34

Referring to the table above, since the angle $\theta_3$ starts out greater than 45° and less than 90°, the rotational direction of the second link 36 is in substantially a forward and upward direction, i.e., the pivot location 50 is moving in a forward and upward direction, pulling the swing arm 32 in a forward direction. Since the angle $\theta_4$ starts out between 90° and 180°, the rotational direction of the first link 34 is in a downward and forward direction, i.e., the pivot location 48 is moving in a downward and forward direction. Since the angle $\theta_4$ is between 145° and 180° at the rest position, the initial rotation of the first pivot is in a more downward direction that forward direction, which cantilevers the swing arm 32 about the pivot location 50. Still further, since the angle $\theta_4$ is between about 155° and 135° at a point about half of the maximum compression travel, the rotational direction of the first link 34 is almost equally in the downward direction and the forward direction. Finally, since the angle $\theta_4$ is between about 125° and 100° at a point about the maximum compression travel, the rotational direction of the first link 34 is substantially more in the forward direction than in the downward direction.

While it is apparent that the invention herein disclosed is well calculated to fill the objectives above, it will be appreciated that numerous modification and embodiments may be devised by those skilled in the art. It is intended that the appended claims cover all such modifications and embodiments as fall within the true spirit and scope of the present invention.

We claim:

1. A suspension system for absorbing shock applied to a rear wheel of a vehicle having a frame and controlling the motion of the rear wheel through compressive travel, the suspension system comprising:

a. a frame member having a first connection point and a second connection point;

b. a rear wheel having a rear wheel axle;

c. a swing arm having two ends, the swing arm being coupled to the rear wheel axle at one end and having a third connection point at the other end and a fourth connection point therebetween;

d. a first link coupling the first connection point on the frame to the third connection point on the swing arm;

e. a second link coupling the second connection point on the frame to the fourth connection point on the swing arm; and f. a shock absorber coupled between the swing arm and the frame for resisting the relative motion between the swing arm and the frame caused by shock to the rear wheel;

wherein the frame, swing arm and first and second links are configured to form a four-bar linkage having an instantaneous center that moves in a vertically downward direction through a substantial portion of the rear wheel compression travel and the third and four connection points move in a forward direction during the rear wheel compression travel.

2. The suspension system according to claim 1, wherein the frame, swing arm and first and second links are further configured such that the instantaneous center also moves in a substantially forward direction through a substantial portion of the rear wheel compression travel.

3. The suspension system according to claim 2, wherein the frame, swing arm and first and second links are further configured such that the instantaneous center is at a vertical height that is above the rear wheel axle during a first portion of the rear wheel compression travel.

4. The suspension system according to claim 3, wherein the frame, swing arm and first and second links are further configured such that the instantaneous center moves in a direction that is more downward than forward during the first portion of the rear wheel compression travel.

5. A suspension system for absorbing shock applied to a rear wheel of a vehicle having a frame and controlling the motion of the rear wheel through compressive travel, the suspension system comprising:

a. a frame member having a first connection point and a second connection point;

b. a rear wheel having a rear wheel axle;

c. a swing arm having two ends, the swing arm being coupled to the rear wheel axle at one end and having a third connection point at the other end and a fourth connection point therebetween;

d. a first link coupling the first connection point on the frame to the third connection point on the swing arm;

e. a second link coupling the second connection point on the frame to the fourth connection point on the swing arm; and f. a shock absorber coupled between the swine arm and the frame for resisting the relative motion between the swing arm and the frame caused by shock to the rear wheel;

wherein the frame, swing arm and first and second links are configured to form a four-bar linkage having an instantaneous center that moves in a vertically downward direction through a substantial portion of the rear wheel compression travel;

wherein the frame, swing arm and first and second links are further configured such that the instantaneous center also moves in a substantially forward direction through a substantial Portion of the rear wheel compression travel;

wherein the frame, swing arm and first and second links are further configured such that the instantaneous center is at a vertical height that is above the rear wheel axle during a first portion of the rear wheel compression travel;

wherein the frame, swing arm and first and second links are further configured such that the instantaneous center moves in a direction that is more downward than forward during the first portion of the rear wheel compression travel; and wherein the frame, swing arm and first and second links are further configured such that the instantaneous center moves in a direction that is more forward than downward during a second portion of the rear wheel compression travel.

6. A suspension system for absorbing shock applied to a rear wheel of a vehicle having a frame and controlling the motion of the rear wheel through compressive travel, the suspension system comprising:

a. a frame member having a first connection point and a second connection point;

b. a rear wheel having a rear wheel axle;

c. a swing arm having two ends, the swing arm being coupled to the rear wheel axle at one end and having a third connection point at the other end and a fourth connection point therebetween;

d. a first link coupling the first connection point on the frame to the third connection point on the swing arm;

e. a second link coupling the second connection point on the frame to the fourth connection point on the swing arm; and f. a shock absorber coupled between the swing arm and the frame for resisting the relative motion between the swing arm and the frame caused by shock to the rear wheel;

wherein the frame, swing arm and first and second links are configured to form a four-bar linkage having an instantaneous center that moves in a vertically downward direction through a substantial portion of the rear wheel compression travel; and wherein the first link is coupled to the frame such that the third connection point moves in a downward and forward direction during a substantial portion of the rear wheel compression travel.

7. The suspension system according to claim 1, wherein the second link is coupled to the frame such that the fourth connection point moves in a upward and forward direction during a substantial portion of the rear wheel compression travel.

8. The suspension system according to claim 1, wherein the instantaneous center is located at a position above the rear wheel axle such that the rear wheel axle travels in a rearward and upward direction through a first portion of the rear wheel compression travel.

9. The suspension system according to claim 8, wherein the instantaneous center is located at a position below the rear wheel axle such that the rear wheel axle travels in a forward and upward direction through a second portion of the rear wheel compression travel.

10. A suspension system coupling a wheel to a vehicle frame, the suspension system comprising:

a swing arm for coupling to a wheel axle;

a coupling for pivotly connecting the swing arm to a vehicle frame;

a moving equivalent pivot point created by the coupling that moves in a forward and downward direction during upward movement of the wheel axle and that is located such that the wheel axle moves in an upward and backward direction during an initial portion of the upward movement of the wheel axle;

wherein the coupling is comprised of two links pivotly connected to the frame and the swing arm to form a four-bar linkage with the swing arm and the frame; and wherein the swing arm is connected to the wheel axle at a first end thereof and to a first of the two links at a second end thereof, and is connected to the second of the two links at an intermediate location between the first and second ends thereof.

11. The suspension system according to claim 10, wherein the first link is coupled to the frame and swing arm such that the second end of the swing arm moves in a downward and forward direction during upward movement of the wheel axle.

12. The suspension system according to claim 11, wherein the second link is coupled to the frame such that the intermediate location of the swing arm moves in an upward and forward direction during upward movement of the wheel axle.

13. The suspension system according to claim 10, wherein the frame, swing arm and the first and second links are configured such that the first end of the swing arm moves in a rearward and upward direction during an initial portion of the upward movement of the wheel axle and moves in a forward and upward direction during a later portion of the upward movement of the wheel axle.

14. A bicycle comprising:

a. a frame comprising a down tube with a crank assembly coupled thereto;

b. a front wheel;

c. a front fork assembly for coupling the front wheel to the frame;

d. a rear wheel; and e. a suspension assembly for coupling the rear wheel to the frame, the suspension assembly comprising:

(1) a swing arm having a first end coupled to the rear wheel and a second end having a first connection point and an intermediate point between the first and second ends having a second connection point;

(2) a first link coupled to the first connection point and to the frame; and (3) a second link coupled to the second connection point and to the frame;

wherein the frame, the swing arm and the first and second links form an equivalent pivot point of the suspension assembly that remains above the crank assembly and that moves in a forward direction during all upward travel of the rear wheel.

15. The bicycle according to claim 14, wherein the frame, the swing arm and the first and second links form an effective pivot point of the suspension assembly that is above the crank assembly and that also moves in a downward direction when the rear wheel moves in an upward direction.

16. The bicycle according to claim 15, wherein the first and second links are coupled to the frame on an upper side of the down tube at third and fourth connection points respectively.

17. The bicycle according to claim 16, wherein the swing are is angled between 10° and 20° from the horizontal plane including the rear wheel axle prior to any upward movement of the rear wheel.

18. The bicycle according to claim 14, wherein the first link is coupled to the frame such that the first connection point moves in a downward and forward direction when the rear wheel moves in an upward direction.

19. The bicycle according to claim 18, wherein the second link is coupled to the frame such that the second connection point moves in an upward and forward direction when the rear wheel moves in an upward direction.

* * * * *

UNITED STATES PATENT AND TRADEMARK OFFICE
CERTIFICATE OF CORRECTION

PATENT NO. : 5,791,674

DATED : August 11, 1998

INVENTORS : D'Aluisio et al.

It is certified that error appears in the above-identified patent and that said Letters Patent is hereby corrected as shown below:

Column 9, line 57 (claim 5, line 17): change "swine" to --swing--.

Column 12, line 28 (claim 17, line 2): change "are" to --arm--.

Signed and Sealed this

Twenty-seventh Day of October, 1998

Attest:

BRUCE LEHMAN

*Attesting Officer*  *Commissioner of Patents and Trademarks*